US008837857B2

(12) United States Patent
Hartley et al.

(10) Patent No.: US 8,837,857 B2
(45) Date of Patent: Sep. 16, 2014

(54) ENHANCING IMAGE DATA

(75) Inventors: Richard Hartley, Red Hill (AU); Robby Tan, Utrecht (NL); Peter Carr, Braddon (AU)

(73) Assignee: National ICT Australia Limited, Eveleigh, New South Wales (AU)

( * ) Notice: Subject to any disclaimer, the term of this patent is extended or adjusted under 35 U.S.C. 154(b) by 423 days.

(21) Appl. No.: 13/263,300

(22) PCT Filed: Apr. 9, 2009

(86) PCT No.: PCT/AU2009/000439
§ 371 (c)(1),
(2), (4) Date: Dec. 20, 2011

(87) PCT Pub. No.: WO2010/115228
PCT Pub. Date: Oct. 14, 2010

(65) Prior Publication Data
US 2013/0141594 A1    Jun. 6, 2013

(51) Int. Cl.
G06K 9/40 (2006.01)
H04N 5/225 (2006.01)

(52) U.S. Cl.
USPC .... 382/275; 382/254; 348/207.1; 348/E5.024

(58) Field of Classification Search
USPC ................ 382/275, 254; 348/207.1, E05.024
See application file for complete search history.

(56) References Cited

U.S. PATENT DOCUMENTS

| 8,396,324 B2 * | 3/2013 | Kang et al. ............... 382/275 |
| 2004/0005089 A1 * | 1/2004 | Robles et al. ............. 382/141 |
| 2008/0069445 A1 | 3/2008 | Weber |
| 2008/0193034 A1 | 8/2008 | Wang |

OTHER PUBLICATIONS

R. Fattal, "Single Image Dehazing", SIGGRAPH 2008, 9 pages.
N. Hautiere et al., "Towards Fog-Free In-Vehicle Systems through Contrast Restoration", IEEE Computer Vision and Pattern Recognition CVPR 2007, 8 pages.
G. Chen et al., "A Novel Method for Moving Object Detection in Foggy Day", EighthACIS International Conference on Software Engineering, Artificial Intelligence, Networking and Parallel/Distributed Computing, 2007, pp. 53-58.
S. Shwartz et al., "Blind Haze Separation", IEEE Computer Vision and Pattern Recognition CVPR 2006, vol. II, pp. 1984-1991.

(Continued)

Primary Examiner — Michelle Entezari

(57) ABSTRACT

The invention concerns image processing that includes the estimation of the optical depths of points in image data in order to enhance the image data. In particular but not limited to, from the optical depth noise present in the image due to aerosol in the scene, such as fog or haze, can be reduced. The invention concerns determining a first cost for each point independently based on a determined metric (60) and then a second cost based on an expected correlation in neighboring points (70). The two costs are then optimized (80) to determine an estimated optical depth for each point (80) that is then used to reduce the effect of aerosol in the image (84). Applications of the invention include, but is not limited to, surveillance systems so that objects in the scene of the image can be better identified once the image data has been enhanced to reduce the estimated noise. Aspects of the invention include a method, software, computer apparatus and a field programmable gate array.

26 Claims, 19 Drawing Sheets

(56) References Cited

OTHER PUBLICATIONS

S.G. Narasimhan et al., "Contrast Restoration of Weather Degraded Images", IEEE Transactions on Pattern Analysis and Machine Intelligence, vol. 25, No. 6, Jun. 2003, pp. 713-724.
S. G. Narasimhan et al., "Interactive (De)Weathering of an Image using Physical Models", ICCV, 2003, 8 pages.
R. V. Klassen, "Modeling the Effect of the Atmosphere on Light", ACM Transactions on Graphics, vol. 6, No. 3, Jul. 1987, pp. 215-237.
R.T. Tan, "Visibility in Bad Weather from a Single Image", IEEE Computer Society Conference on Computer Vision and Pattern Recognition, 2008, 8 pages.
S.K. Nayar et al., "Vision in Bad Weather", IEEE International Conference on Computer Vision, ICCV, 1999, 8 pages.
H. Ishikawa, "Exact Optimization for Markov Random Fields with Convex Priors", IEEE Transactions on Pattern Analysis and Machine Intelligence, vol. 25, No. 10, pp. 1333-1336 (17 pages) Oct. 2003.
R. Szeliski et al., "A Comparative Study of Energy Minimization Methods for Markov Random Fields", in proceedings ECCV 2006, Part II, LNCS 3952, pp. 16-29.
A. Gijsenij et al., "Color Constancy using Natural Image Statistics", in proceedings of IEEE Computer Vision and Pattern Recognition CVPR, 2007, 8 pages.
C.F. Bohren et al., "Fundamentals of Atmospheric Radiation; 8 Meteorological Optics: The Reward", Wiley-VCH, 2006, 55 pages.
S. G. Narasimhan et al., "Vision and the Atmosphere", International Journal of Computer Vision 48(3), pp. 233-254, 2002.

\* cited by examiner

*Algorithm:* Estimating $L_\infty$
*Input:* Weather degraded image $\mathbf{I}$
*Output:* Weather degraded image $\mathbf{I}'$ such that horizon is white 1. Compute the intensity image $\mathbf{Y}$ of $\mathbf{I}$
2. Identify the top 5% brightest pixels in $\mathbf{Y}$
3. Compute the average appearance $L_\infty$ of these pixels in $\mathbf{I}$
4. Compute the colour corrected version $\mathbf{I}'$ as:

$$\mathbf{I}' = \frac{\mathbf{I}}{L_\infty}$$

Fig. 3(d)

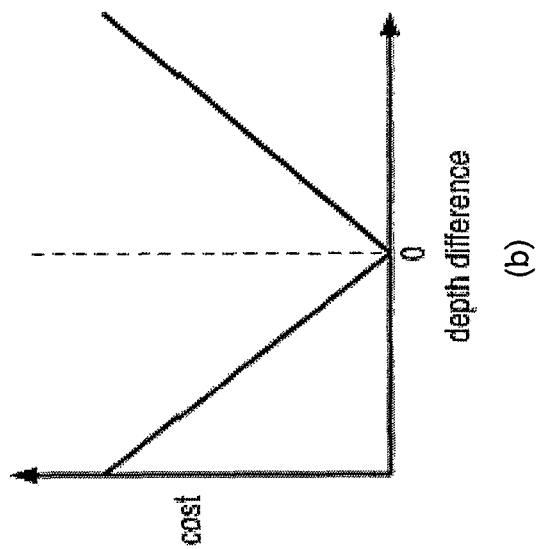
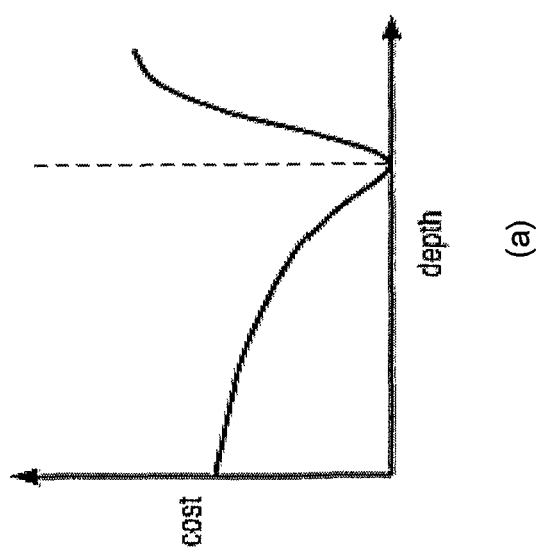
Fig. 5

Algorithm: Example 1

Input: $L_{obs}$

Output: $L_0$

1. Correct $L_{obs}$ using Algorithm X.
2. Compute the data terms $E_i(z_i)$ using Algorithm Z.
3. Compute the smoothness terms $E_{ij}(z_i, z_j)$ using Eq 12.
4. Compute the labelling z using graph-cuts or some other MRF optimization technique.
5. Compute the enhanced image L0 using Eq 4 and each value $z_i$.

Fig. 8

Algorithm: Contrast Metric

Input: $L_{obs}$

Output: The set of cost functions $\{ E_i(z) \}$ for i in $L_{obs}$ for z = 1 to m 1. Crop an n×n patch in $L_{obs}$, centred on i.

2. Enhance each pixel within the patch using the current value of z and Eq. 4

3. $E_i(z)$ = sum of image gradients within the enhanced patch using Eq. 7 end

4. Find the value of z for which this patch achieves the highest contrast

5. Normalize the tabulated costs $E_i(z)$ using Eq. 11 end

ENHANCING IMAGE DATA

TECHNICAL FIELD

The invention concerns image processing that includes the estimation of the optical depths of points in image data in order to enhance the image data. In particular but not limited to, from the optical depth noise present in the image due to aerosols in the scene, such as fog or haze, can be reduced. Applications of the invention include, but are not limited to, surveillance systems so that objects in the scene of the image can be better identified once the image data has been enhanced to reduce the estimated noise. Aspects of the invention include a method, software, computer apparatus and a field programmable gate array.

BACKGROUND OF THE INVENTION

Poor visibility in bad weather is a major problem for many applications of computer vision. Most automatic computer vision systems, such as surveillance, intelligent vehicles, outdoor object recognition, assume that the input images have good visibility. Unfortunately, this is not always true as bad weather introduces noise into image data. As a result it is important to first process the image data to enhance visibility.

In most computer vision applications, inferences about the content of the image are assembled from low-level image processing operations, such as edge detection or background subtraction. In general, the reliability of these processes degrades rather quickly as image quality decreases. For instance, edge detection looks at the difference in intensities between a pair of neighbouring pixels. If the difference is large, there is most likely an edge between them.

Noise in images due to suspended fine solid and liquid particles in the scene known as aerosols, such as fog, reduces the quality and contrast of the captured image, which means (in the edge detection example) the likelihood of the edge detector providing sufficiently reliable information for high-level inferences is reduced, as the intensity difference is lower.

Fog occurs when water droplets are suspended in the air. As shown in FIG. 1, the presence of fog or any other aerosol leads to two types of light reaching the camera or observer: "transmitted" and "path" components (referred to as the "direct" and "airlight" components in [1]). Referring first to the "transmitted" component shown in FIG. 1(a), light 11 from the illumination source 10 reflects off objects in the scene and travels 12 towards the observer or camera 15. There is also a secondary diffuse illumination source 14 created from light which has already reflected off surfaces in the scene, such as the ground. When an aerosol is present, the amount of diffuse light increases, as the direct light is scattered multiple times before reaching the surfaces of the scene. Similarly, light 12 may scatter 16 while travelling towards the observer. As a result, the signal reaching the observer or camera 15 is an attenuated version of that which would have been recorded without the aerosol present. Put another way, this "transmitted" or "direct" component is a diminished version of radiance $L_0$ at the surface of the object, and the attenuation is determined by the optical distance $\beta d(x)$ [1], where x represents a particular point in the image, $d(x)$ the geometric distance of said point, and $\beta$ is the extinction co-efficient:

$$L_{transmitted}(x) = L_0(x) e^{-\beta d(x)} \tag{1}$$

Referring now to FIG. 1(b), the aerosol also produces a second "path" or "airlight" radiance, where ambient illumination 20 (identical to 14 in FIG. 1(a)) is scattered 21 towards the observer or camera 15. Again, some of this light may scatter 22 while travelling towards the observer or camera 15. In most situations, fog is adequately dense to assume that there is no direct illumination 11—only constant isotropic diffuse ambient illumination 14. Under this assumption, the "path" component (relative to the radiance of the horizon, $L_\infty$) becomes [1]:

$$L_{path}(x) = L_\infty (1 - e^{-\beta d(x)}) \tag{2}$$

The magnitudes of the "transmitted" and "path" components both depend on the distance and properties of the aerosol. The radiance, $L_{obs}$, reaching the observer is the sum of the "transmitted" and "path" components.

$$L_{obs}(x) = L_{transmitted}(x) + L_{path}(x) \tag{3a}$$
$$= L_0(x) e^{-\beta d(x)} + L_\infty (1 - e^{-\beta d(x)}) \tag{3b}$$

Re-arranging, one can recover an expression for the radiance at the surface $L_0$, which represents how the point x should appear under diffuse illumination without the aerosol present in the atmosphere [1]:

$$L_0(x) = [L_{obs}(x) - L_\infty (1 - e^{-\beta d(x)})] e^{\beta d(x)} \tag{4}$$

In grey scale images, $L_{obs}$, $L_0$ and $L_\infty$ are all scalar quantities. In colour images they are usually vectors of length three. If the extinction co-efficient $\beta$ is constant, we can define an auxiliary variable $z = e^{-\beta d(x)}$, and express each of Eqs. (1) to (4) relative to this new variable (instead of x).

SUMMARY OF THE INVENTION

In a first aspect the invention provides a method of enhancing image data representing an image of a scene including aerosols, the method comprising:

(a) associating a first cost to each point in the image data based on a determined metric of that point having a candidate optical depth, where the determined metric of that point is independent of the determined metric of remaining points in the image;

(b) associating second costs to sets of two or more points in the image, where each second cost is based on the candidate optical depths of the points of the associated set compared to at least one predetermined correlation of optical depths of points in a set;

(c) determining an estimate optical depth for each point by optimising a combination of the first costs and second costs; and (d) for each point, using the respective estimated optical depth to enhance that point in the image data.

It is an advantage of the invention that it is able to take into account the optical depth on a per point basis. In this way the optical depths, and therefore the estimated noise, for the image is more accurate than an estimate produced using a global optical depth estimate. It is a further advantage that the optical depth can be estimated without any geometric information about the image or any user interactions.

The costs may be a quality metric such as any one or more of:
  intensity
  contrast,
  colour,
  hue,
  saturation,
  geometric distance, such as scene geometry or image plane geometry; or entropy.

Step (a) may further comprise determining the first cost of each point by:

enhancing that point based on a candidate optical depth; and determining the quality metric of the point compared to the enhanced version of that point.

The candidate optical depth may be a set of optical depths, and the quality metric may be determined for that point for each optical depth in the set of optical depths. The first cost function may be a tabulation of values.

The candidate optical depth may be a predetermined algebraic expression and may be different for different points.

Alternatively, step (a) may further comprise determining the first cost of each point by determining a dissimilarity between a metric of that point enhanced based on the candidate optical depth and a metric of an equivalent point in a reference image.

Step (b) is performed automatically, that is, it does not require input from the user.

Each point may be considered in four or eight sets of two points, each set including that point and one of an immediate neighbouring point of that point.

The predefined correlation may be that points of a set have similar optical depths.

The predefined correlation may be that optical depths of vertically and/or horizontally aligned points of a set have increasing optical depths in a predetermined direction.

The predefined correlation may be that there is no correlation between points in a set.

The second costs may also depend on other factors, such as image plane distance or intensity. For example, the predetermined correlation may be based on image intensity or colour values of points of a set. The predetermined correlation may be based on edge strengths in the image between points of the set.

The first and second costs may be defined in such a way that the formulation is consistent with that of a Markov Random Field or Conditional Random Field.

The estimate of optical depths may be confined to a predetermined range of optical depths comprised of a set of discrete values. This may be a labelling problem wherein each point is assigned a label associated with one of the discrete values.

The optimising of step (c) may comprise using graph cuts, such as $\alpha$-expansion, $\alpha$-$\beta$ swap or multi-label graph cuts.

Alternatively, the optimisation of step (c) may comprise using simulated annealing, (loopy) belief propagation, iterative conditional modes or message passing algorithms, such as tree reweighted message passing.

The method may further comprise using the enhanced image in further image processing, such as object detection in the images.

The image data may represent a time ordered sequence of images. Estimating the optical depth for that point in other images in the sequence may be based on a previously determined optical depth for the equivalent point in the one or more previous images in the sequence. The method may be performed on a subset of the time ordered sequence of images, such as every fourth image.

The aerosol in the image may be fog or haze. The point may be one or more pixels.

In another aspect the invention comprises software that when installed in a computer causes it to operate in accordance with the method described above. The software may be written in OpenGL.

In yet another aspect the invention is a computer apparatus to enhance image data representing an image of a scene including aerosols, the computer having:

storage means to store the image data; and software installed to cause a processor to operate in accordance with the method described above. The computer may be a computer vision system including a camera to capture the image data. The processor may be a central processing unit of a general purpose computer or a graphics processing unit of a graphics card.

In yet a further aspect the invention is a field programmable gate array designed to implement the method described above. For example, the invention may be implemented in the hardware of a graphics card of a computer system. A first or second cost may be determined with reference to a table of predetermined costs.

In another aspect the invention is a method of enhancing image data representing an image of a scene including aerosols, the method comprising:

(a) defining a function over all points in the image that represents the probability of each point having a particular optical depth;

(b) estimating the most probable optical depth for each point in the image by optimizing the function;

(c) for each point, enhancing the associated image data using the estimated optical depth of that point.

The function may be dependent on any one or more of:

the image data itself predetermined geometric information about the scene, or previous image data of the scene.

Where the function is dependent on image data alone, step (b) requires no extra information from either a user or additional sensors.

The function may be an energy function associated with a Markov Random Field.

The invention does not require the use of specialised hardware, such as polarizers or infrared (IR) cameras. The invention can be used with cameras that capture images only in the visible spectrum. It is an advantage of at least one embodiment of the present invention that the invention can retrospectively be applied for use with existing camera installations of video surveillance systems.

Further, the algorithm aims to enhance the noisy images, so that low-level image processing techniques can still provide suitable information to the higher-level image understanding algorithms. Although an approximation of the scene on a clear day would be useful to a human operator, this is not necessarily the optimal correction for a computer vision system.

BRIEF DESCRIPTION OF THE DRAWINGS

FIGS. 1(a) and (b) schematically show the "transmitted" and "path" components of light respectively (prior art). A non-limiting example of the invention will now be described with reference to the following drawings, in which:

FIG. 3(d) is pseudo code for estimating $L_\infty$;

FIG. 5(*a*) is a representation of a cost versus depth chart for a quality metric of a point for Example 1;

FIG. 5(*b*) is a representation of the cost versus depth chart for applying a predetermined correlation to the estimated optical depths of Example 1;

FIG. 8 is the pseudo code for visibility enhancement of Example 1;

FIG. 9 is the pseudo code for data cost of Example 1;

FIG. 12(*b*) schematically shows the geometry of an image taken by a camera; and FIG. 12(*c*) is a representation of a cost v depth difference for applying a predetermined correlation to the estimated optical depths of Example 2.

BEST MODES OF THE INVENTION

Figure 1:
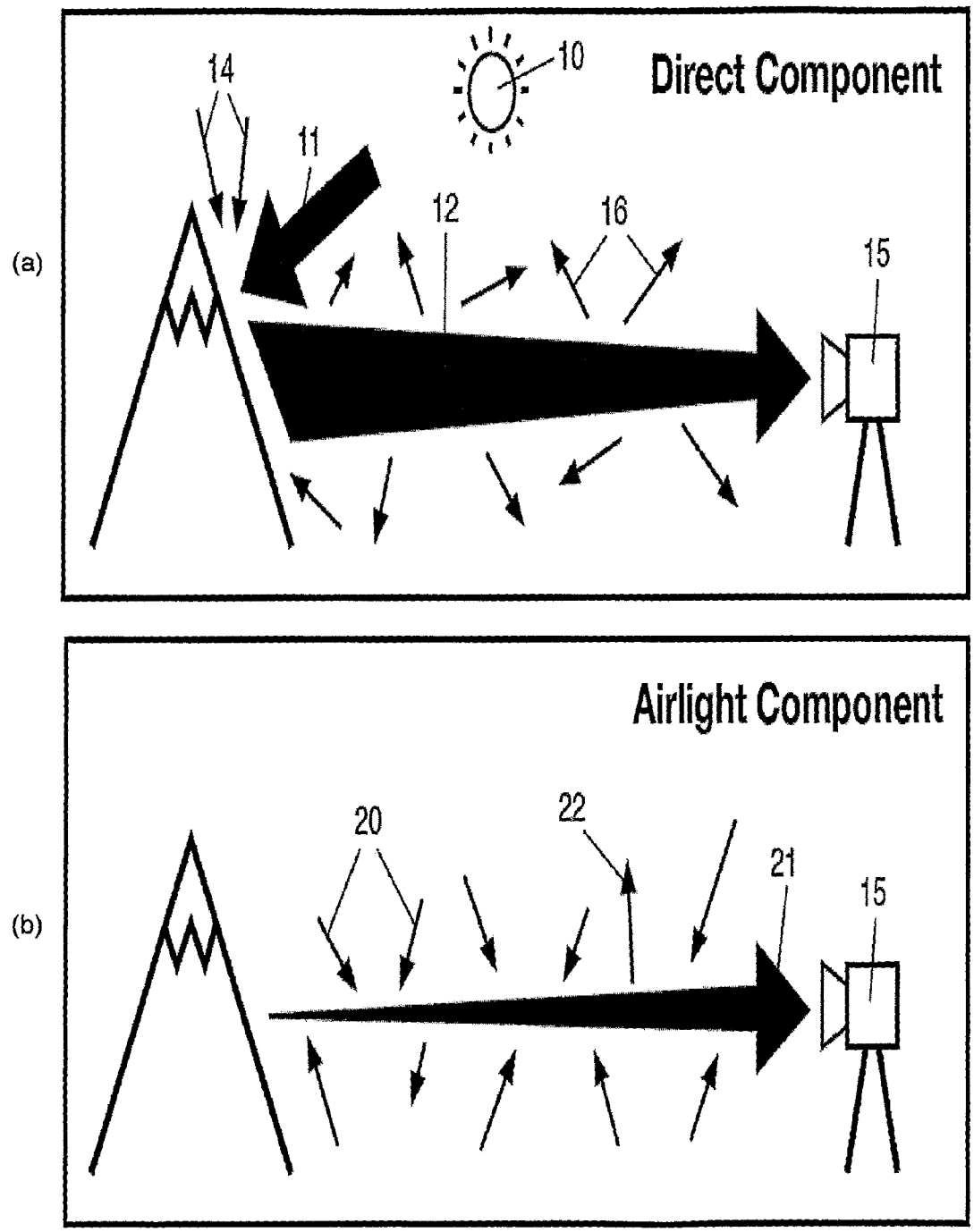
Figure 2:
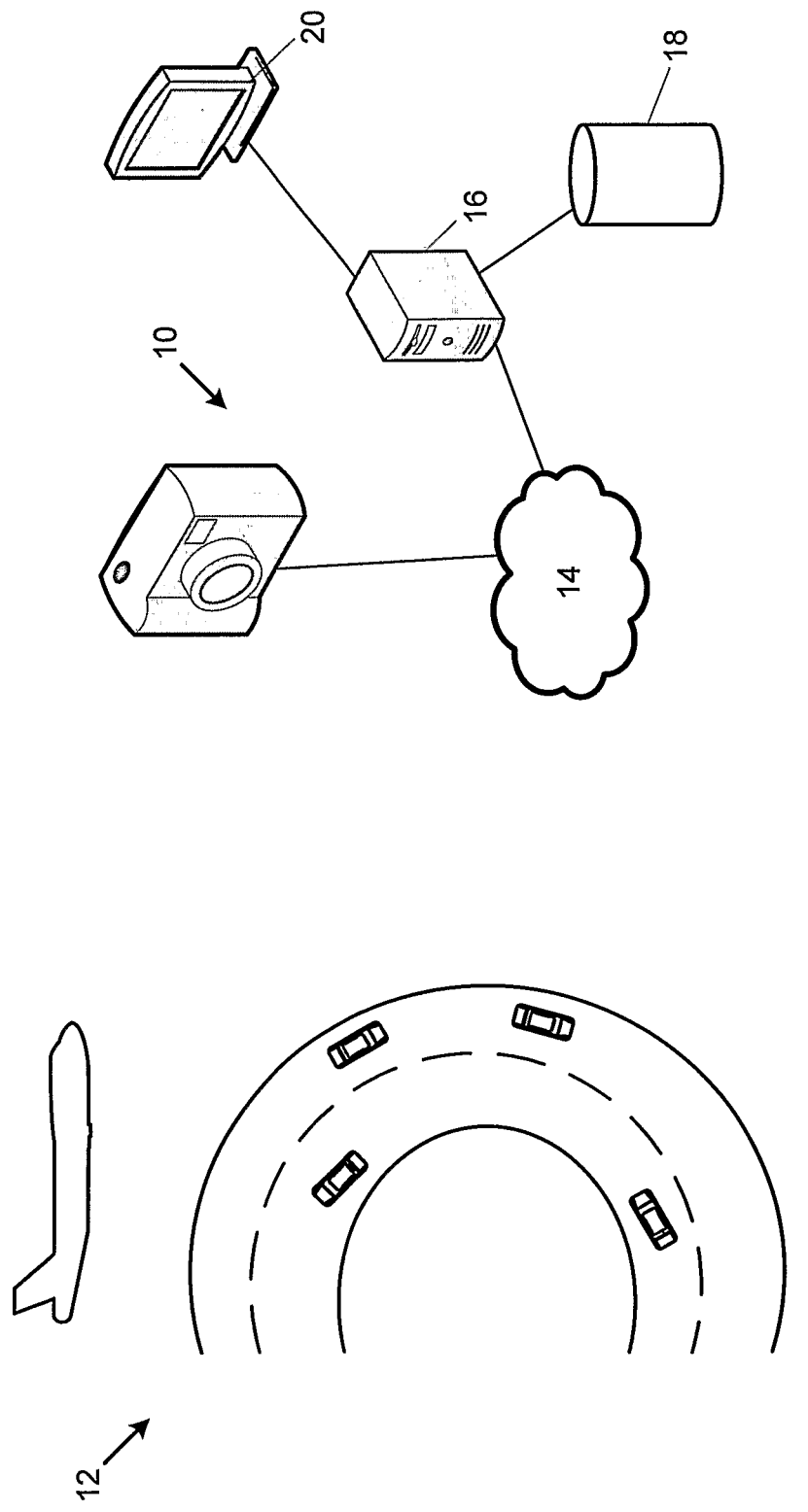
FIG. 2 is a schematic diagram of video surveillance system of an example of the invention.

Referring first to FIG. 2, in this example the invention is applied to a video surveillance system 10 in which a video camera 12 captures a visible scene 12 as image data. The image data represents a sequence of images that form a video. The video camera 10 operates in the visible spectrum only.

The video camera 10 includes a processor that automatically causes the captured image data, possibly compressed, to be transmitted in real-time over the Internet 14 to a server 16 that is also connected to the Internet 14. The server 16 receives and stores the image data in a local datastore 18. The server 16 also stores processor readable instructions and a processor of the server 16 operates to read and execute the instructions to cause the server 16 to operate as described in further detail below. A display device, such as a monitor 20 may be connected to the server to display the enhanced images.

A person skilled in art would recognise that various video surveillance system 10 described here can be used with the invention. For example, the transmission of image data may be performed wirelessly. Alternatively, the server 16 may be directly connected (i.e. not over the Internet) to the camera 10. The server 16 may in fact be a personal computer.

In this video surveillance system 10 a background subtraction algorithm may be applied early in the processing of the sequence of images.

A sample image as captured by the camera 10 is shown in FIG. 3(*a*), and includes noise introduced by the presence of aerosols (e.g. fog) in the scene. The image is comprised of a set of points, and in this example a point is a pixel.

Estimating how a pixel would appear with reduced noise caused by the fog requires knowing the optical depth. The optical depth is the geometric distance, d, scaled by the extinction co-efficient of the fog, β. As a result, estimating the noise in the image caused by fog (and thereby being able to enhance the image by removing the fog) is equivalent to the task of estimating an optical depth map for a set of points in a foggy input image.

The appearance of the horizon, $L_\infty$, should be white [2], but since cameras are usually governed by automatic exposure circuitry and white balance, this is not always the case Further, haze may also be coloured. Typically, the horizon is the brightest part of the image, and we can formulate an estimate of $L_\infty$ using the high intensity pixels from the foggy image (steps 2 and 3 in FIG. 3(*d*)). We can then apply simple colour correction (step 4 in FIG. 3(*d*)) to ensure that $L_\infty$ is white [1]. Once this correction is performed, in greyscale (monochrome) images, $L_\infty=1$; in RGB colour images:

$$L_\infty = \begin{bmatrix} 1 \\ 1 \\ 1 \end{bmatrix}$$

If β is constant, estimating $L_0$ requires knowing the values of $z_i = e^{-\beta d_i}$ for each pixel i. The actual optical depth $\beta d_i$ is not needed. Since each $z_i$ is confined to the range (0,1], we can quantize it into m discrete values and formulate the task as a labelling problem—that is, every pixel is assigned a label from the set $\{1, 2, 3, \ldots, m\}$, with each label representing a particular value of $e^{-\beta d}$. The best label is found by formulating a cost function and then finding the label which produces the minimum cost.

Although optical depths are estimated for each pixel independently, we can improve the robustness of the results by requiring local consistency or agreement between the labels. For instance, neighbouring pixels in an image probably belong to the same object, and should therefore have the same (or at least very similar) depths. We take "local" to mean the four immediate neighbours of a pixel, so that the formulation is consistent with a second-order Markov Random Field.

Figure 4A:
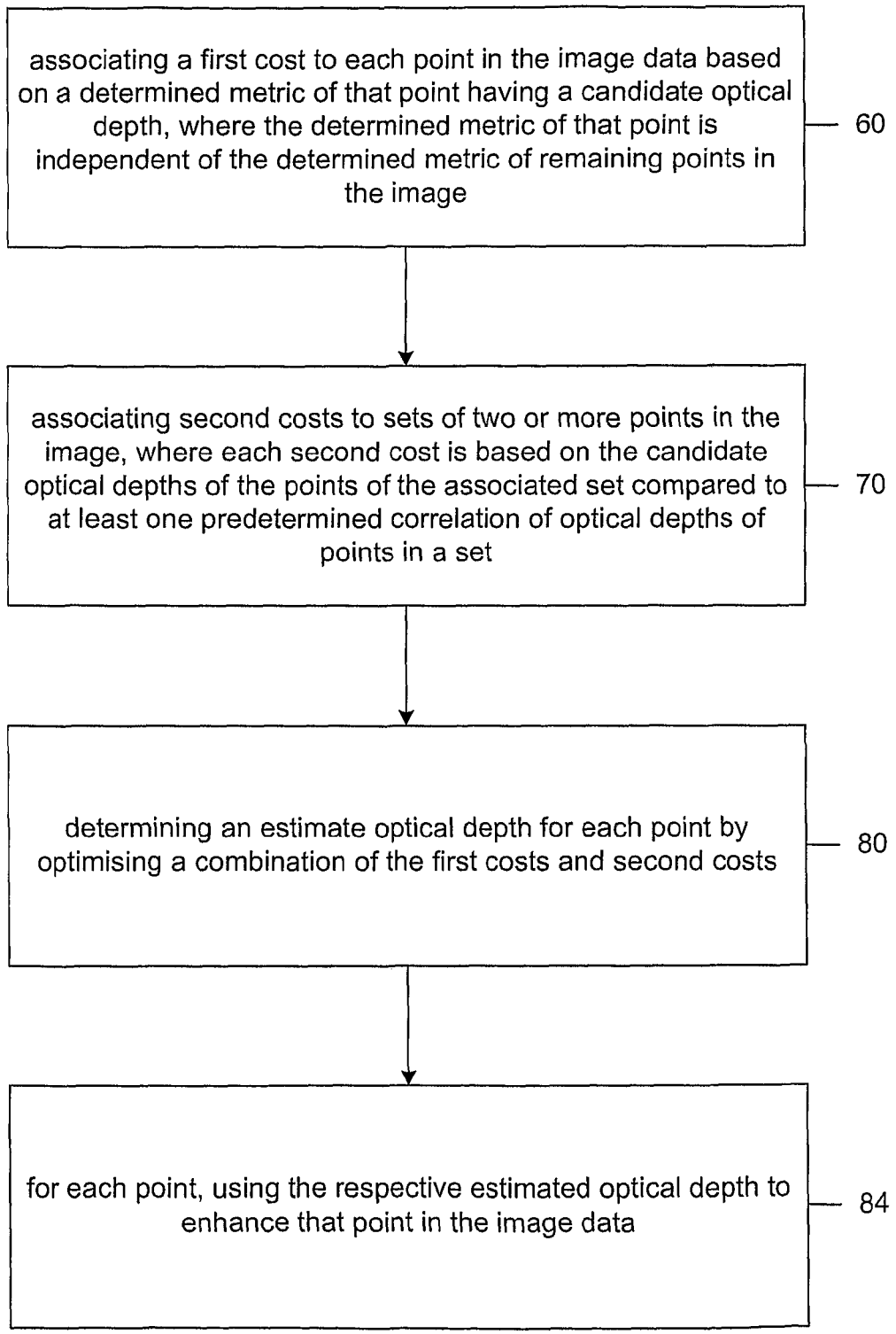
FIG. 4(a) is a flowchart of an example of the invention.
Figure 4B:
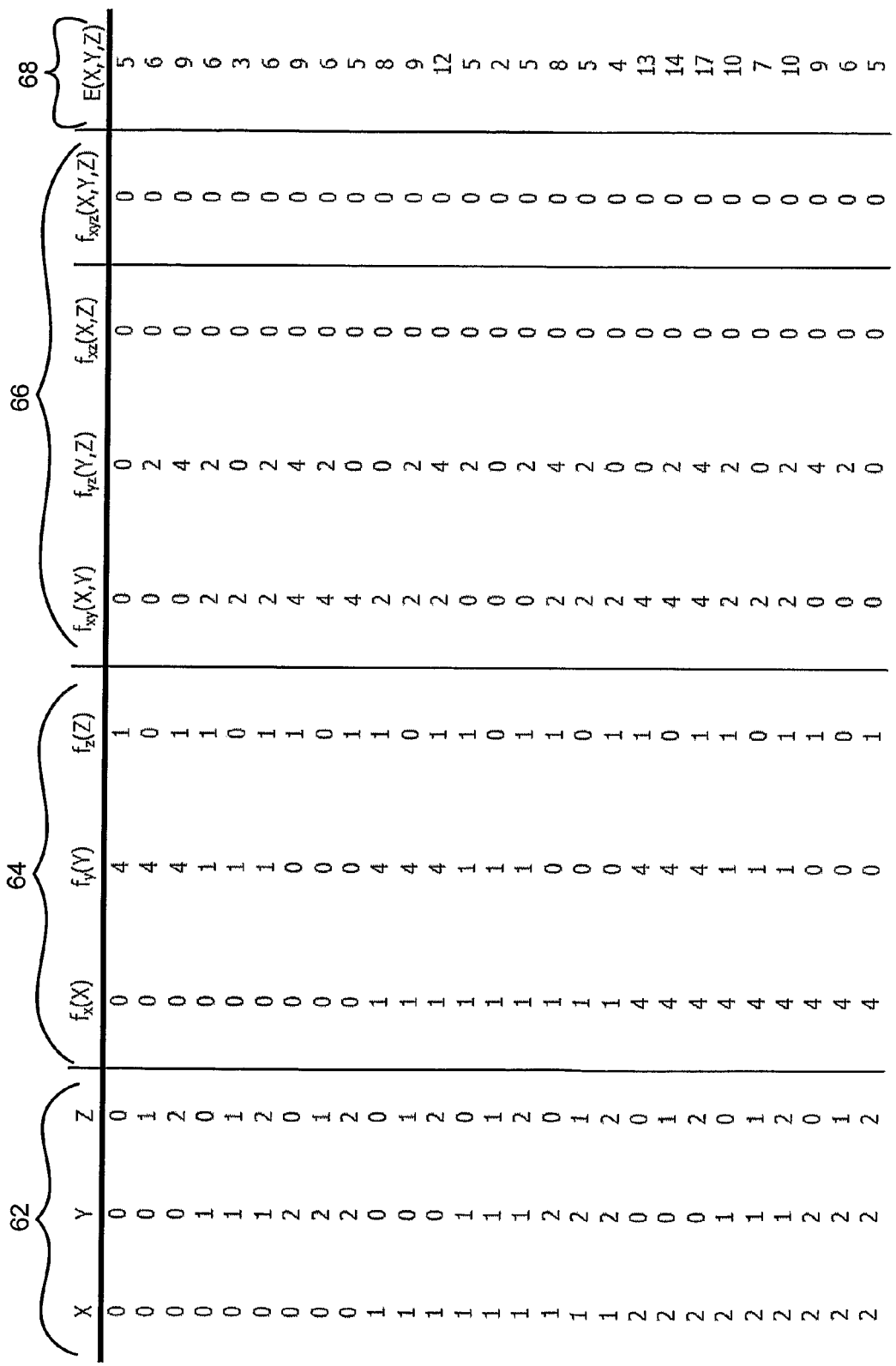
FIG. 4(b) is a tabulation of example first, second and combination costs.

As a result, the process of estimating an optical depth map for the image splits into two independent tasks as shown in FIG. 4:

associating a first cost to each point in the image data based on a determined metric of that point having a candidate optical depth, where the determined metric of that point is independent of the determined metric of remaining points in the image 60; and associating second costs to sets of two or more points in the image, where each second cost is based on the candidate optical depths of the points of the associated set compared to at least one predetermined correlation of optical depths of points in a set 70. This step need not be performed after step 60 as it does not rely on the first cost.

Then we determine an estimate optical depth for each point by optimising the combination of the first costs and second costs 80, and using the respective estimated optical depth to enhance that point in the image data 84 so as to reduce the effect of aerosol induced noise in the image data.

Since there is no guarantee that the optimal label for each pixel will adhere to the assumed local pattern, the optimization process produces labels which are a compromise between the optimal solutions for each of the first and second costs when considered individually.

Example simplified calculations of steps 60, 70 and 80 will now be described with reference to FIG. 4(*b*). Here we consider three points x, y and z. Each point can take the candidate optical depth (for simplicity) of 0, 1 or 2. That means there are twenty-seven possible combinations of candidate optical depth values for x, y and z. These combinations are shown at 62.

We define a first cost 60 for each point, in this case $f_x(x)=x^2$, $f_y(y)=(y-2)^2$ and $f_z(z)=(z-1)^2$. The first cost values for points x, y and are shown at 64.

We then determine second costs 70 for the set of points {x,y}, {y,z}, {x,z} and {x,y,z}. The costs are arbitrarily defined as: $f_{xy}(x,y)=2|x-y|$, $f_{yz}(y,z)=2|y-z|$, $f_{xz}(x,z)=0$ and $f_{xyz}(x,y,z)=0$. These second cost values are determined for each combination of x, y and z values and are shown at 66.

A cumulative cost (i.e. energy) function is determined, in this case $E(x,y,z)=f_x(x)+f_y(y)+f_z(z)+f_{xy}(x,y)+f_{yz}(y,z)+f_{xz}(x,z)+f_{xyz}(x,y,z)$. The values of the cumulative cost function are shown at 68. Optimisation of the energy function comprises identifying the values of the points x, y and z that produce a minimum value of $E(x,y,z)$. It can be seen that 2 is the minimum value of $E(x,y,z)$ and this corresponds to the candidate optical depth of 1 for points x, y and z. In general, there could be more than one minimum value of $E(x,y,z)$, however, only one minimum needs to be identified even though there might be multiple.

Example 1

Where No Reference Image is Available

In this example, no additional information about the image is available (such as a less noisy image of the scene captured when there was no fog).

Here for the first cost 60, optical depth values are estimated by trying to match the statistics of the enhanced image to baseline statistics of natural images. Since an image of the scene with less noise should be of higher quality than the captured foggy image, we can estimate the depth of a pixel by determining the distance at which the corrected local image region achieves maximum 'information'. This strategy will only produce an enhanced image—not an estimate of scene on a clear day.

In this example we use contrast as a measure of information, although a variety of other metrics could be employed. In this example the contrast metric is calculated using the sum of image gradient magnitudes.

This example assumes there is significant texture in the image so that values for the contrast metric can be determined. As result with this example, textureless regions of the image, such as the sky, will contain significant enhancement artifacts, as the region is forced to have artificially high contrast.

We divide the image into small 5×5 patches and iterate over the possible labels (i.e. optical depth values). Each patch is enhanced using the hypothesized optical distance and then the contrast metric of the enhanced patch measured. We record the optical depth at which the patch achieves its maximum contrast metric, and use this to invert the function so that the optical depth which achieves maximum contrast has the minimum cost. This is shown in FIG. 5(a).

Ideally, each pixel (the centre of the 5×5 patch) should be assigned the depth which gives it maximal contrast, and which corresponds to the minimum value in FIG. 5(a). However we also assume that neighboring values should be similar and from this determine one or more reference sets of points having optical depths that confirm to this similar behaviour 70 and incorporate an additional cost of deviating from this pattern (i.e. correlation) a function of the distance between the labels (i.e. optical depths). This is shown on FIG. 5(b).

Example 1 will now be described with in further details as follows:

Eq. (4) produces an estimate $L_0(x)$ of the scene not affected by scattering or absorption, but requires values of $L_{obs}(x)$ and $d(x)$ for every point x (where x is a 2D spatial location) as well as global estimates of $L_\infty$ and $\beta$.

Instead of directly estimating $L_0(x)$, we can first estimate $z=e^{-\beta d(x)}$, which is considerably easier to compute, since it is independent of an object's appearance, and is solely dependent on the depth, $d(x)$, given that we have assumed that $\beta$ and $L_\infty$ are globally constant.

The number of known variables in Eq. (4) is less than the number of unknown variables. However, there are some clues or observations that can be considered:

1. The output image, $L_0$ must have better contrast compared to the input image, $L_{obs}$.
2. The variation of the values of $e^{-\beta d(x)}$ is dependent solely on the depth of the objects, $d(x)$, implying that objects with the same depth will have the same value of $e^{-\beta d(x)}$, regardless their appearance. Thus, the values of $e^{-\beta d(x)}$ for neighboring pixels tend to be the same. Moreover, in many situations $e^{-\beta d(x)}$ changes smoothly across small local areas. The exception is pixels at depth discontinuities, whose number is relatively small.

Aside from the two main observations above, we can also consider that:

3. The input images that are plagued by bad weather are normally taken from outdoor natural scenes. Therefore, the correct values of $L_0$ must follow the characteristics of clear-day natural images.

For the first clue, we quantitatively define the contrast C(I) of an image I in association with the number of edges, which can be written formally as:

$$C(I) = \sum_x |\nabla I(x)| \qquad (5)$$

where $\nabla$ is the gradient operator. This equation implies that an image with more contrast produces a larger number of edges. In other words, clear-day images have a larger number of edges than those affected by bad weather: $C(L_0) \geq C(L_{obs})$.

The values of $L_0$ are limited to the range [0.0,1.0]. Therefore, if we have a small image patch, p(x), that contains objects with the same depth and affected by bad weather, then there is a scalar value $e^{-\beta d(x)}$, which can give the correct $L_0$, where $L_0$ must follow these constraints:

$$C(L_0(x)) \geq C(p(x)) \qquad (6)$$

$$0 \leq L_0(x) \leq 1 \qquad (7)$$

Figure 6A:
FIG. 6(*a*) is a natural image and FIG. 6(*b*) is the image of FIG. 6(*a*) synthesized with fog.
Figure 6B:
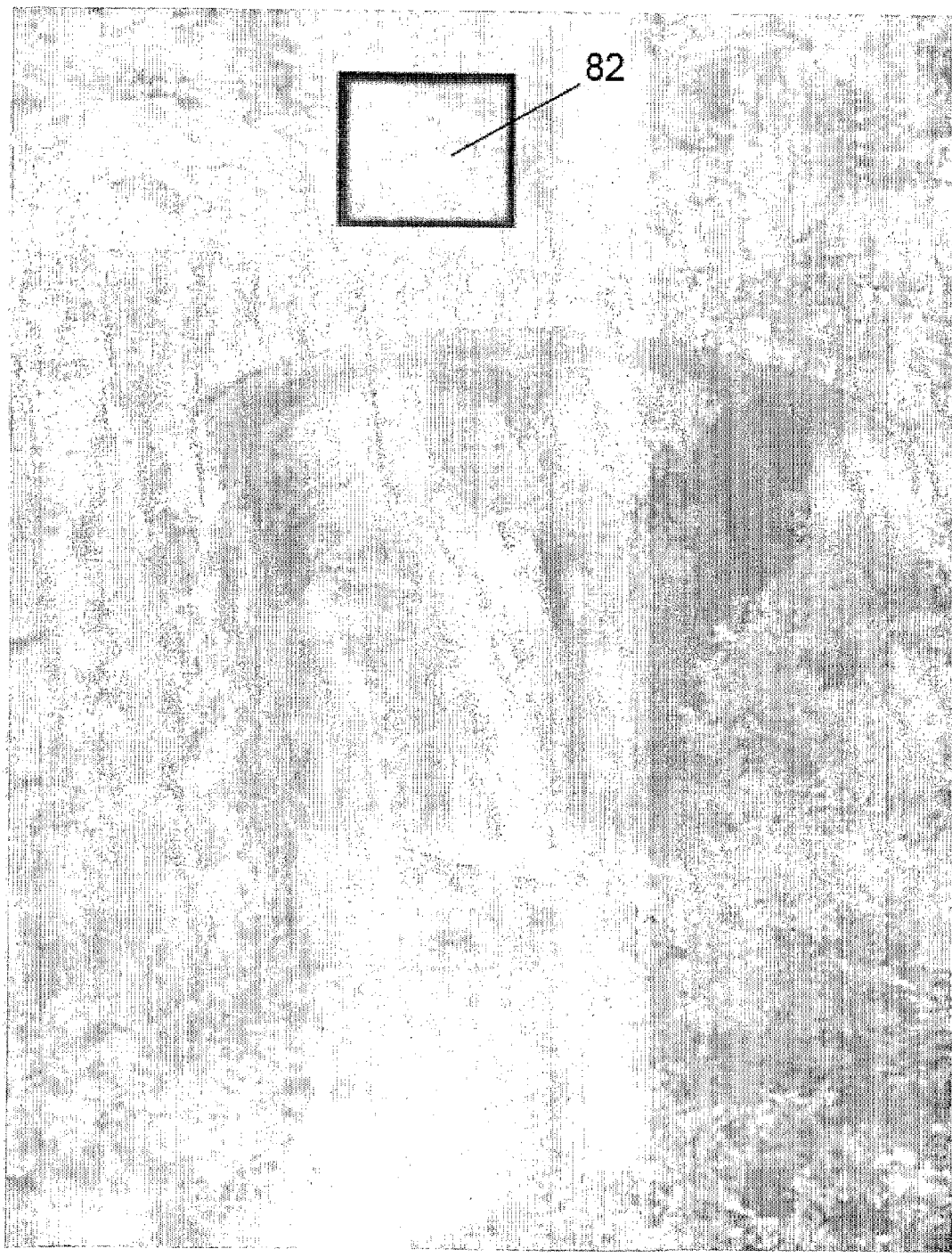
Figure 7:
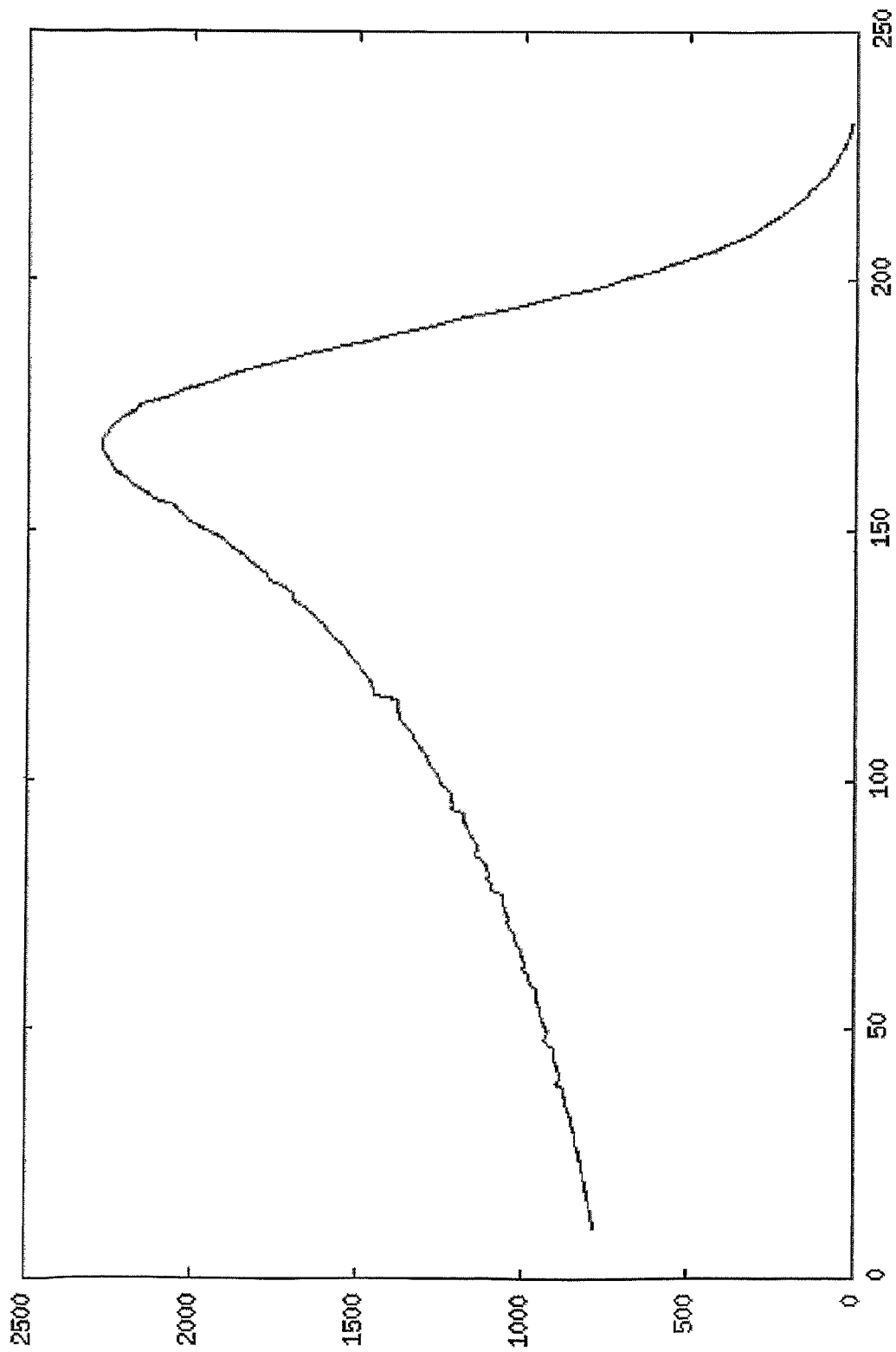
FIG. 7 is the measured contrast within the box 82 of FIG. 7(*b*) with respect to every possible optical depth value, where the inversion of this function is FIG. 5(*a*).

FIG. 6 shows a natural image in a clear day and the artificial fog on the image that the path or airlight component $L_{path}(z)=1-z$ Eq. (2) is set constant (globally) across the image. We crop the artificial-fog image to have a small-squared patch 82, compute C(p(x)) for all values of z, and plot the correlation of the two in FIG. 7. In FIG. 7 the y-axis is C(p(x)) and the x-axis is z. The peak is around z=167/255. As can be observed in FIG. 7, the value of C(p(x)) increases along with the increase of z and declines after reaching a certain peak. This rapid decline is mainly caused by imposing the second constraint Eq. (7). We argue that the correlation prevails for every image patch taken from any kind of scenes plagued by bad weather, as long as the image patch has textures in it, implying that C(p(x))>0. The proof is as follows. Substituting Eq. (4) into Eq. (5), we obtain:

$$C(p(x)) = \Sigma |[L_{obs}(x+1) - (1 - e^{-\beta d})]e^{\beta d} - [L_{obs}(x) - (1 - e^{-\beta d})]e^{\beta d}|$$

$$= e^{\beta d} \Sigma |L_{obs}(x+1) - L_{obs}(x)|$$

$$= \frac{1}{z} \Sigma |L_{obs}(x+1) - L_{obs}(x)|$$

since $\Sigma|L_{obs}(x+1) - L_{obs}(x)|$ has the same value for the same image patch, then $C(p(x))$ will be inversely proportional to z. This explains the increase in FIG. 7. However, following the second constraint in Eq. (7) we restrict $L_0$ to [0.0,1.0], therefore $C(p(x))$ will decline regardless the increase of z. Note that, d is independent from x, since we assume that z is constant across the patch.

In our framework to enhance visibility, we use $C(p(x))$ as our cost function 60. While the largest number of $C(p(x))$ does not always represent the actual value of $L_{path}$, it represents the enhanced visibility of the input image. This is suitable since we do not intend to recover the original colour or reflectance of the images in clear days. Our main purpose is to enhance the visibility of scenes in bad weather with some degree of accuracy on the scene's colours.

According to the second clue, the changes of $z_i$ across the image tend to be smooth for the majority of the pixels. This motivates us to model z (representing the path or airlight component) using Markov random fields (MRFs) 70. We write the potential energy function of second-order MRFs as:

$$E(z) = \sum_i E_i(z_i) + \lambda \sum_{(i,j)} E_{ij}(z_i, z_j) \qquad (8)$$

Here, $E_i(z_i)$ is based on the contrast measure discussed previously. Each function $C_i(\ )$ is normalized to occupy the range [0.0,1.0] by dividing by the maximum value. The scaled function is then inverted, so that the minimum of the function corresponds to the best candidate optical depth.

$$E_i(z_i) = 1 - \frac{C_i(p(L_0(z_i)))}{\max(C_i(p(L_0(\cdot))))} \qquad (9)$$

The second term (the smoothness term) is defined as:

$$E_{ij}(z_i, z_j) = |z_i - z_j| \qquad (10)$$

This equation encourages smoothness for neighboring $z_i$. To find all values or labels $z=\{z_i\}$, we have to minimize the energy function Eq. (8) using the existing inference techniques, such as graph-cuts or belief-propagation [4] 80.

We further explain the detailed implementation of the framework described in Eq. (8) and discuss a few other issues for improving the results and computational time.

Pseudocode of FIG. 8 shows the detailed algorithm of our method. Given an input image $L_{ops}$, in step 1, we correct the image using the algorithm in FIG. 3(d) so that $L_\infty=1$. However, to be more accurate, we can estimate using an existing colour constancy method (e.g. [3]).

We compute the data cost for every pixel of $L_{obs}$ in step 4. The detail of the algorithm for computing the data cost is described in pseudocode of FIG. 9.

The pseudocode of FIG. 9 starts with an iteration of every pixel in $L_{obs}$. x represents the 2D location of a pixel. In step 4.1, we crop an n×n patch which is centred at a location x. n must be small enough to make the assumption that the airtight in the patch is uniform valid, yet not so small that we could possibly lose the texture or edge information. The patch size could be 5×5 or 7×7, depending on the size and scale of the input image. In step 4.2 and 4.2.1, for every possible value of z, we compute the enhanced version of the patch, using Eq. (4). Then, in step 4.2.2, we compute the contrast using Eq. (5). After all iterations finish, the contrast measure is normalized and inverted Eq. (9), where for each pixel, $E_i(z)$ is a vector of m values.

Figure 10A:
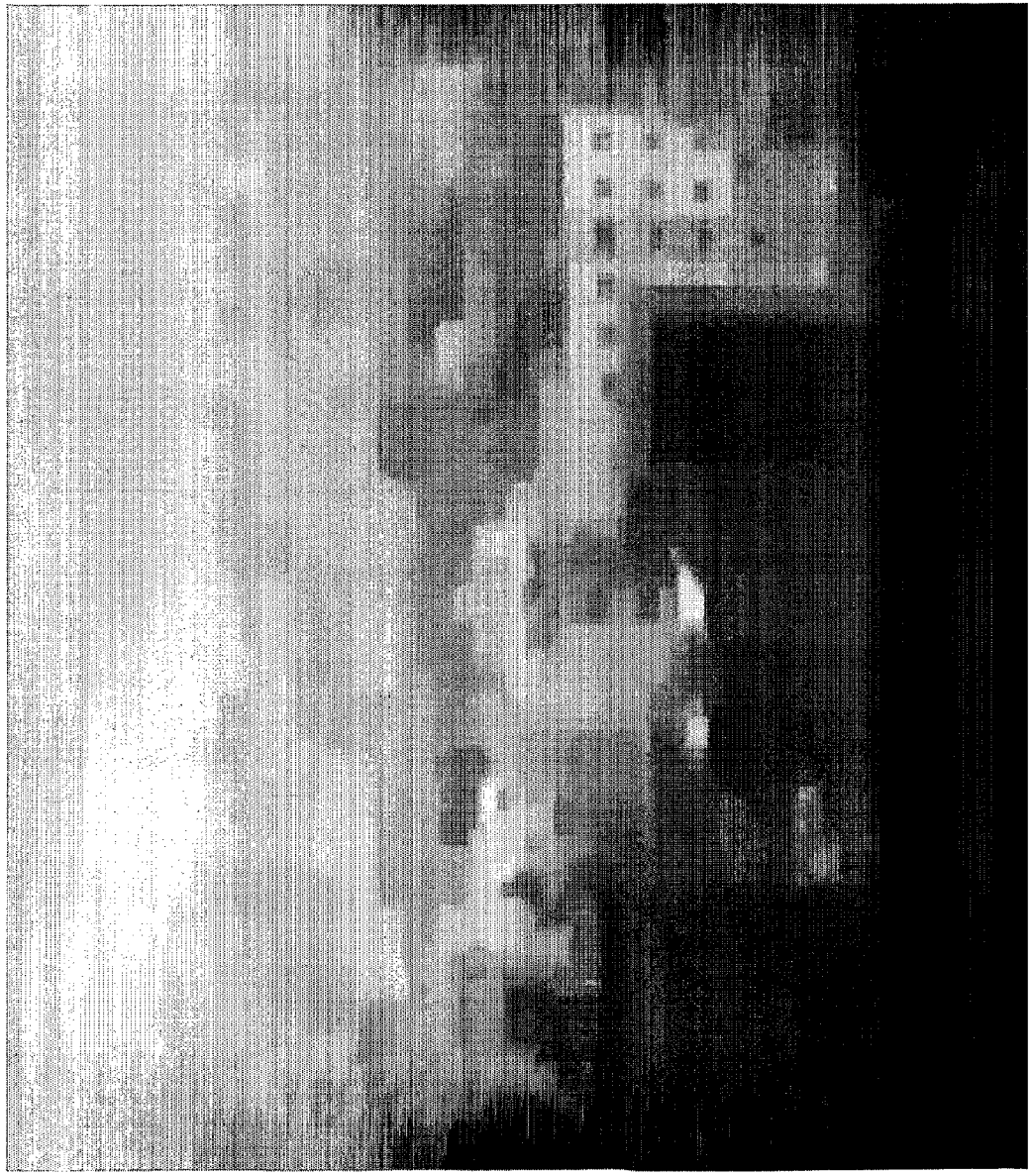
FIG. 10(*a*) is an image showing the estimated "path" or "airlight" component and FIG. 10(*b*) is the same image as FIG. 10(*a*) but showing the estimated source radiance for Example 1.
Figure 10B:

After computing the data cost, in step 5 of the pseudocode of FIG. 8, we compute the smoothness cost using Eq. (10). In step 6, to do the inference in MRFs with number of labels equal to m, we use the graph-cut algorithm alpha-expansion with multiple labels (i.e. [4]). In step 7, we finally compute the direct attenuation for the whole image from the estimated airtight using Eq. (3a). FIGS. 10(a) and (b) show the results of the airtight, $L_{path}$, and the corresponding enhancement $L_0$ respectively.

To determine the parameter $\lambda$, which controls the strength of the smoothing, we can empirically learn from a database of foggy images and their corresponding clear day images. We examine $\lambda$ by comparing images that have been enhanced using various $\lambda$ with their corresponding clear day images, and choose the best $\lambda$ that gives considerably good results for the majority of the images.

For grey images, the algorithm is exactly the same, except that each image only contains 2D data, and the horizon brightness $L_\infty$ is a scalar and not a three-vector.

Graph-cuts and belief propagation are currently the most efficient techniques to optimize the cost function of MRFs, unfortunately they still require a considerable amount of computational time, particularly when the size of the input image and the number of labels are large. To speed up the inference process, we provide initial values for the airtight. For obtaining the initial values of the airtight $L_{path}$, we approximately estimate it through the Y of YIQ colour model, which is defined as:

$$Y = 0.257 I_r' + 0.504 I_g' + 0.098 I_b' \qquad (13)$$

Figure 11A:
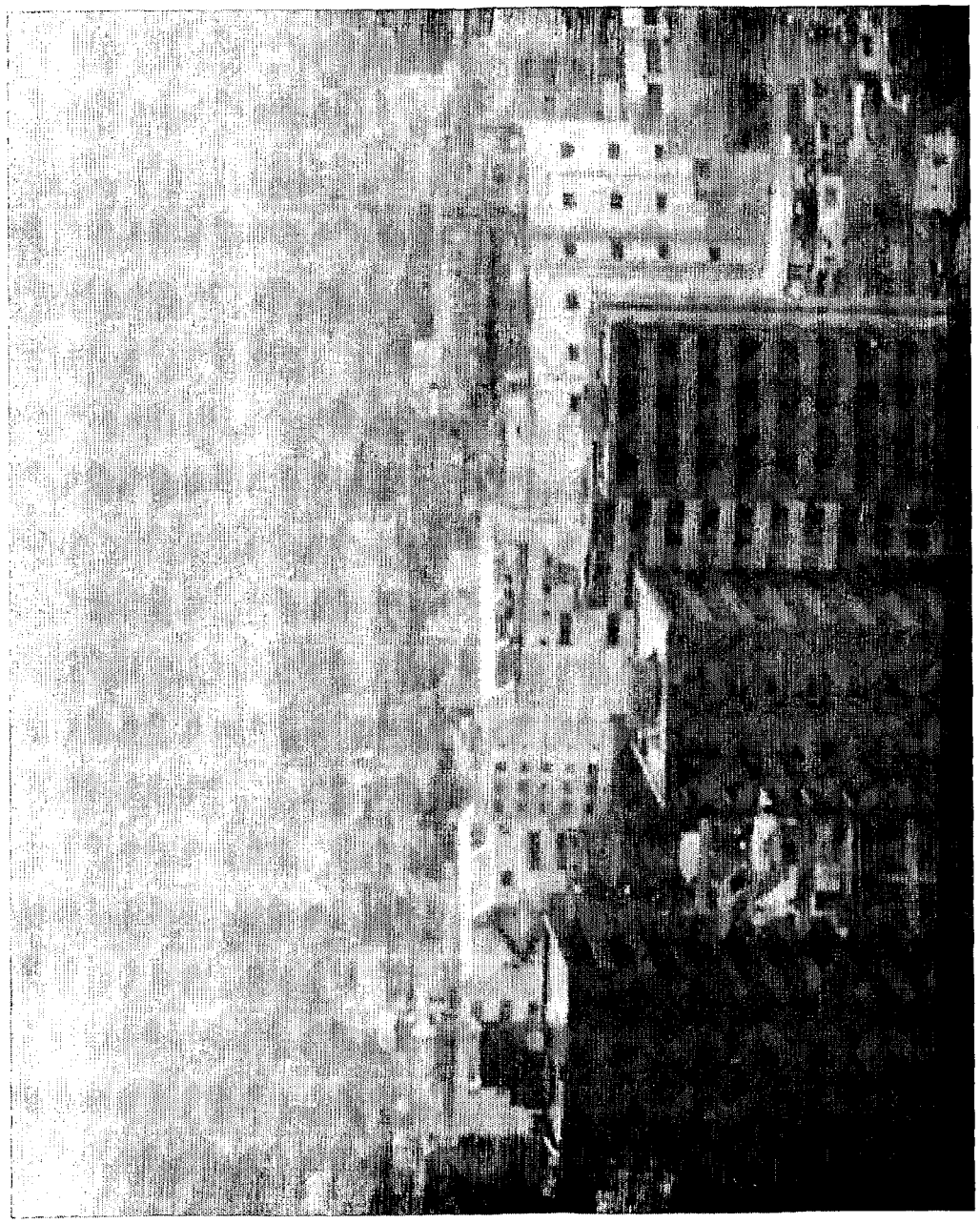
FIG. 11(*a*) is an image showing the values of Y and FIG. 11(*b*) is the same image of FIG. 11 having blurred Y.
Figure 11B:
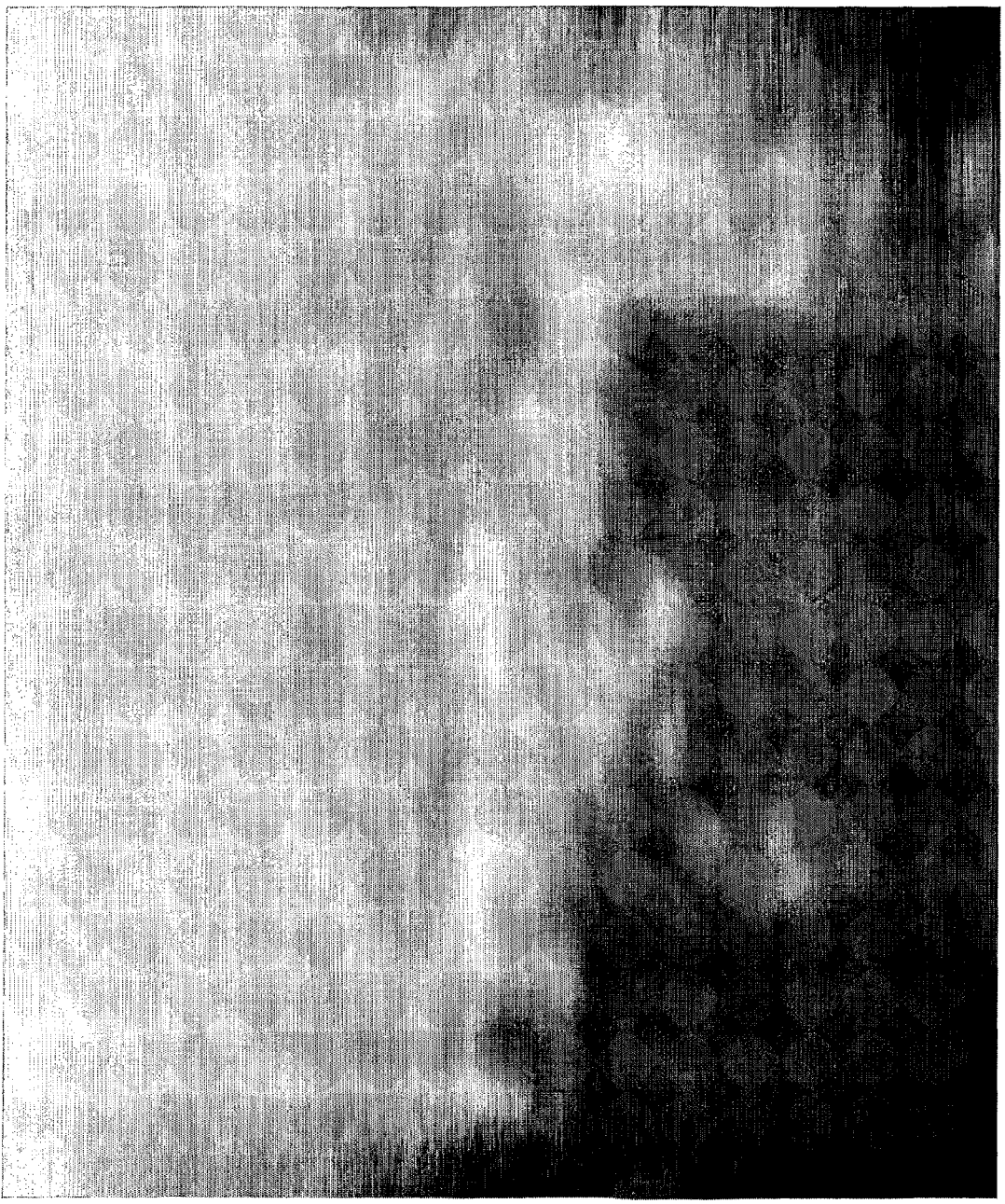

We blur the image that is produced by the values of Y and use this blurred image as the initial values of z. FIG. 11 show the values Y, and the blurred Y (the initial airlight).

Figure 3A:
FIG. 3(a) is a sample image.
Figure 3B:
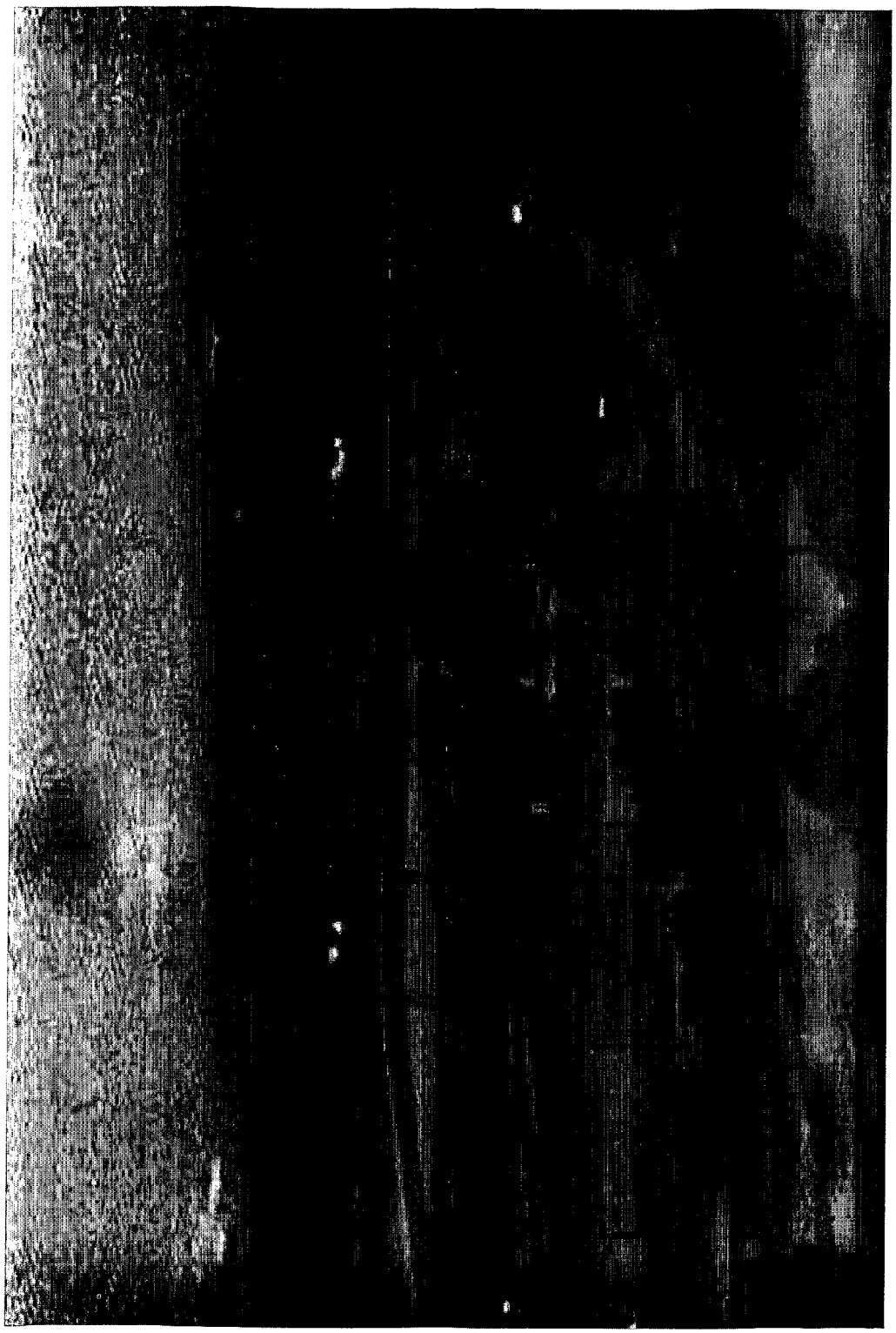
FIG. 3(b) is an enhanced version of the sample image of FIG. 3(a) according to the Example 1.

An enhanced version of the sample image of FIG. 3(a) is shown in FIG. 3(b). This image has been enhanced to remove the noise effect corresponding to the estimated optical depth according to Example 1 of each pixel respectively.

Example 2

Where a Reference Image is Available

This example, utilizes an image $L_{ref}$ of the scene captured in good visibility conditions from which a reference depth can be determined.

For fixed cameras, it's quite easy to record what the scene looks like in clear conditions. For a fixed camera, the enhanced foggy image should appear quite similar to the clear day reference image. As a result, a comparison of the two images can be used to guide the first cost determination 60. Although pan-tilt-zoom cameras are popular for surveillance applications, they often have one or more default orientations, which can be treated as fixed vantage points.

Figure 12:
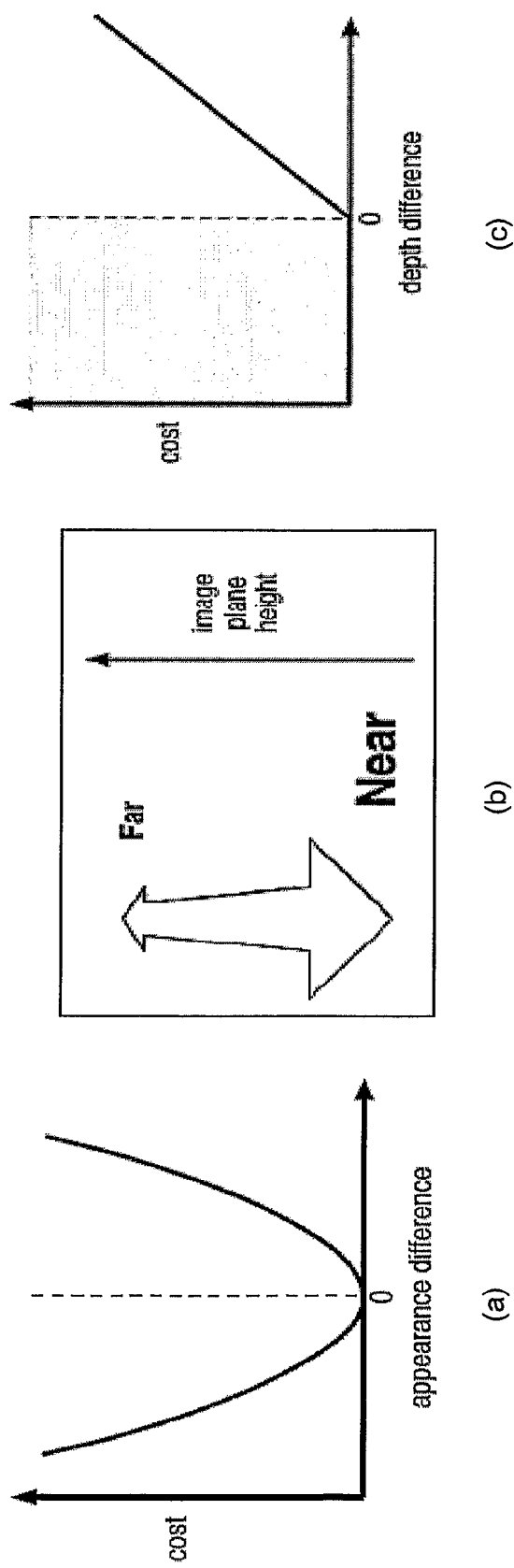
FIG. 12(*a*) is a representation of a cost v appearance difference chart for a quality metric of a point for Example 2.

If the only difference between the reference image and the noisy (i.e. foggy) image is the presence of the fog, each pixel, when enhanced, should be very similar to its equivalent in the reference image. Of course, there are several reasons why an enhanced pixel may differ significantly from the reference image. If the pixel corresponds to a foreground object, it will most likely not occur in the other image, as there is usually a large time gap between the two images. Similarly, in fog, many surfaces become wet, and their appearance may change drastically. Pavement, for instance becomes darker and possibly reflective if puddles form. However, a significant portion of the image will probably adhere to this assumption, so we can model the cost of a particular optical depth by examining how close the enhanced pixel appears to the corresponding pixel from the reference image Eq. (11). This is shown in FIG. 12(a), a probability cost function is based on the differences.

$$E_i(x_i)=\|L_{ref}(i)-L_0(i,x)\|^2 \quad (11)$$

This example employs a more complex pattern 70 than Example 1, and is based on camera geometry. We assume the camera is placed upright, and in a typical surveillance pose (high in the air and tilted down towards the ground). In this situation, pixels towards the bottom of the image should appear close to the camera, while pixels at the top of the image should be far away, see FIG. 12(b). We constrain the solution so that the optical depths must always increase when scanning the image from bottom to top Eq: (12). Essentially, we are assuming there are no objects in the scene that we can see under, such as a bridge or building overhang. Incorporating this restriction allows producing a reliable optical depth map from the foggy image quite quickly. Referring to FIG. 12(c) we assign infinite cost to any pair of vertical labels which does not adhere to this pattern.

$$E_{ij}(x_i, x_j) = \begin{cases} \infty & \text{if } i \text{ below } j \text{ and } x_j < x_i \\ |x_i - x_j| & \text{otherwise} \end{cases} \quad (12)$$

The alpha-expansion algorithm was used in the previous example. Although it is also able to solve this MRF formulation, we illustrate how different optimisation algorithms can be employed by using the multi-label graph construction of [5]. The algorithm is guaranteed to produce the optimal solution, and initialisation is not necessary. Therefore, unlike the previous example, we do not need to produce a blurred intensity image to generate an initial labelling.

In one alternative to Example 2 multiple reference images could be used to reduce the effect of outliers. The geometric model of the pattern of Example 2 could be expanded incorporate considerations related to horizontal position.

Figure 3C:
FIG. 3(c) is an enhanced version of the sample image of FIG. 3(a) according to the Example 2

An enhanced version of the sample image of FIG. 3(a) is shown in FIG. 3(c). This image has been enhanced to remove the noise effect corresponding to the estimated optical depth according to Example 2 of each pixel respectively.

It will be appreciated by persons skilled in the art that numerous variations and/or modifications may be made to the invention as shown in the specific embodiments without departing from the scope of the invention as broadly described.

It should be noted that the cameras used with this invention can be those limited to the visible spectrum. As a result there is a limit to the enhancement processes. For example, if a large part of the image is completely obscured by fog it is not possible to accurately infer what the scene in the image would look like in good conditions.

While the two examples above are mutually independent we note that the pattern aspects of Example 2 can be augmented with the depth estimation technique of Example 1.

The depth estimation technique of Example 1 can be used in conjunction with the pattern aspects of the reference image, solution of Example 2.

In most surveillance installations, cameras are placed high in the air to maximize coverage and minimize occlusion. As a result, the change in depth between a foreground object and the background behind it is minimal relative to the distance to the camera. In this situation, the depth of each pixel is effectively constant. Moreover, if the fog density does not change, the optical depth of each pixel will also remain the same, and Eq. (3) can be used for successive video frames.

The enhancement operation Eq. (3) is relatively straightforward if $L_{path}$ is fixed. The source radiance $L_0$ is computed using one subtraction and one multiplication operation, followed by a clamping function to ensure the result is within the range [0.0,1.0]. If a computer and software is used to implement the described enhancement method, one can achieve better performance by conducting the enhancement stage with a graphics processing unit (GPU), if one is available within the computer. The enhancement operation is written in OpenGL (or any equivalent graphics card language) and downloaded onto the GPU. When each frame is received from the camera, it is also downloaded onto the GPU. When the optical depth map of the scene has been estimated, it is also downloaded onto the GPU. When all the information is available, the program is able to enhance the downloaded camera frame in real-time. Furthermore, the central processing unit (CPU) may be used to estimate new depth maps while the enhancement operation is conducted in parallel on the GPU. Each new depth map estimate can be downloaded to the GPU as soon as it is available.

Tracking can also be used to assist in estimating the noise. For example, observing objects moving towards or away from the camera at a constant speed (reasonable for vehicles or pedestrians), the estimate of the fog density can be amended by watching how the appearance of the objects degrades or improves as the distances increase or decreases. Moreover, we can also get distances along the ground plane by observing the path of the object in the image plane. Cameras mounted close to the ground for license plate reading application are ideal for this.

A filter may be used to clean up the raw results. A bilateral filter, for instance, considers similarity in intensity, spatial and temporal domains. Alternatively, a per-pixel Gaussian mixture model is able to produce a time averaged background without corrupting the appearance of foreground objects.

The present embodiments are, therefore, to be considered in all respects as illustrative and not restrictive.

REFERENCES

[1] S. G. Narasimhan and S. K. Nayar. "Vision and the Atmosphere". IJCV, 48(3), 233-254, 2002.
[2] Bohren, C. F. and Clothiaux, E. E. Fundamentals of Atmospheric Radiation. Wiley-VCH, 2006.
[3] A. Gijsejij and T. Gevers. Color constancy using natural image statistics. *in proceeding of IEEE CVPR*, 2007.
[4] R. Szeliski, R. Zabih, D. Scharstein, O. Veksler, V. Kolmogorov, A. Agarwala, M. Tappen, and C. Rother. A comparative study of energy minimization methods for markov random fields. *in proceeding of ECCV*, 2006.
[5] H. Ishikawa. Exact optimisation for markov random fields with convex priors. IEEE Transactions on Pattern Analysis and Machine Intelligence, 25(10), 1333-1336, 2003.

Claims defining the invention are as follows:

1. A method of enhancing image data representing an image of a scene including aerosols, the method comprising:
   (a) associating a first cost to each point in the image data based on a determined metric of that point having a candidate optical depth, where the determined metric of that point is independent of the determined metric of remaining points in the image;

(b) associating second costs to sets of two or more points in the image, where each second cost is based on the candidate optical depths of the points of the associated set compared to at least one predetermined correlation of optical depths of points in a set;

(c) determining an estimate optical depth for each point by optimising a combination of the first costs and second costs; and (d) for each point, using the respective estimated optical depth to enhance that point in the image data.

2. The method of claim 1, wherein the determined metric is a quality metric of any one or more of:
intensity,
contrast,
colour,
hue,
saturation,
geometric distance, or
entropy.

3. The method of claim 1, wherein the step (a) further comprises determining the first cost of each point by:
enhancing that point based on a candidate optical depth; and
determining the metric of the point compared to the enhanced version of that point.

4. The method of claim 1, wherein in step (a) the candidate optical depth is a set of optical depths, and the metric is determined for that point for each optical depth in the set of optical depths.

5. The method of claim 1, wherein step (a) comprises determining the first cost of each point by determining a dissimilarity between a metric of that point based on the candidate optical depth and a metric of an equivalent point in a reference image.

6. The method of claim 1, wherein each point is considered in four sets of points, each set including that point and one of the immediate four neighboring points of that point.

7. The method of claim 1, wherein each point is considered in eight sets of point, each set including that point and one of the immediate eight neighboring points of that point.

8. The method according of claim 1, wherein the predetermined correlation is that points of a set have similar optical depths.

9. The method of claim 1, wherein the predetermined correlation is that optical depths of vertically and/or horizontally aligned points of a set have increasing optical depths in a predetermined direction.

10. The method of claim 1, wherein the predetermined correlation is based on image intensity or color values of points of a set.

11. The method of claim 1, wherein the predetermined correlation is based on edge strengths in the image between points of the set.

12. The method of claim 1, wherein the predefined correlation is that here is no correlation between points in a set.

13. The method of claim 1, wherein optimizing of step (c) comprises using a graph cut.

14. The method of claim 1, wherein the method further comprises using the enhanced image in further image processing.

15. The method of claim 1, wherein step (d) enhances that point by using the respective optical depth to remove at least in part the affect the aerosol in the image has on that point.

16. The method of claim 1, wherein the image data represents a time ordered sequence of images and estimating the optical depth for that point in other images in the sequence is further based on a previously determined optical depth for the equivalent point in one or more previous images in the sequence.

17. The method of claim 1, wherein the aerosol in the image is fog or haze.

18. The method of claim 1, wherein the point is one or more pixels.

19. A method of enhancing image data representing an image of a scene including aerosols, the method comprising:
(a) defining a function over all points in the image that represents the probability of each point having a particular optical depth;
(b) estimating the most probable optical depth for each point in the image by optimizing the function; and
(c) for each point, enhancing the associated image data using the estimated optical depth of that point.

20. The method of claim 19, wherein the function is dependent on any one or more of:
the image data itself
predetermined geometric information about the scene, or
previous image data of the scene.

21. The method of claim 19, wherein the function is dependent on image data alone and step (b) requires no extra information from either a user or additional sensors.

22. The method of claim 19, wherein the function is an energy function associated with a Markov Random Field.

23. Software, being computer readable instructions stored on a computer readable medium, that when installed in a computer system causes it to operate in accordance with the method according to claim 1.

24. A computer apparatus to enhance image data representing an image of a scene including aerosols, the computer having:
storage means to store the image data; and
software installed to cause a processor to operate in accordance with the method according to claim 1.

25. The computer apparatus of claim 24, wherein the computer apparatus is a computer vision system including a camera to capture the image data.

26. A field programmable gate array designed to implement the method according to claim 1.

* * * * *